(12) United States Patent
Babcock et al.

(10) Patent No.: US 7,704,185 B2
(45) Date of Patent: Apr. 27, 2010

(54) HYBRID POWERTRAIN TORQUE CONTROL

(75) Inventors: Douglas J. Babcock, Dexter, MI (US);
Leonard G. Wozniak, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 390 days.

(21) Appl. No.: 11/858,366

(22) Filed: Sep. 20, 2007

(65) Prior Publication Data

US 2008/0220934 A1    Sep. 11, 2008

Related U.S. Application Data

(60) Provisional application No. 60/893,262, filed on Mar. 6, 2007.

(51) Int. Cl.
*B60K 1/02*    (2006.01)
(52) U.S. Cl. .......................................................... 477/3
(58) Field of Classification Search ...................... 477/3
See application file for complete search history.

(56) References Cited

U.S. PATENT DOCUMENTS

| | | | | |
|---|---|---|---|---|
| 6,278,915 | B1* | 8/2001 | Deguchi et al. | 701/22 |
| 7,083,543 | B2* | 8/2006 | Loeffler et al. | 477/3 |
| 2008/0234097 | A1* | 9/2008 | Sah | 477/3 |
| 2009/0024263 | A1* | 1/2009 | Simon et al. | 701/22 |

\* cited by examiner

*Primary Examiner*—Dirk Wright

(57) ABSTRACT

A method of regulating a torque output of each of an internal combustion engine (ICE) and an electric machine (EM) in a hybrid powertrain system includes determining a desired axle torque of the hybrid powertrain system and arbitrating the desired axle torque and a first plurality of torque requests in an engine control module (ECM) of the hybrid powertrain system to provide an arbitrated axle torque request. The method further includes arbitrating a torque request, which is based on the arbitrated axle torque request, and a second plurality of torque requests in a hybrid control module (HCM) to provide a final torque request, and generating ICE control signals and EM control signals based on the final torque request.

22 Claims, 3 Drawing Sheets

HYBRID POWERTRAIN TORQUE CONTROL

CROSS-REFERENCE TO RELATED APPLICATIONS

This application claims the benefit of U.S. Provisional Application No. 60/893,262, filed on Mar. 6, 2007. The disclosure of the above application is incorporated herein by reference.

FIELD

The present disclosure relates to a hybrid powertrain of a vehicle, and more particularly to torque control in a hybrid powertrain.

BACKGROUND

The statements in this section merely provide background information related to the present disclosure and may not constitute prior art.

Hybrid powertrains typically include a first torque generator, an internal combustion engine (ICE), for example, and a second torque generator, an electric machine (EM), for example, each of which can provide torque to a driveline to propel a vehicle. Two types of hybrid powertrains include a full hybrid powertrain and a mild hybrid powertrain. In a full hybrid powertrain, the EM can drive the drivetrain directly, without transferring torque through a component of the ICE. In a mild hybrid configuration, the EM is coupled with the ICE, through the accessory drive, for example, whereby torque generated by the EM is transferred to the drivetrain through the ICE. An exemplary mild hybrid powertrain includes a so-called belt alternator starter (BAS) system. In the BAS system, the EM is coupled to the ICE via a traditional belt and pulley configuration, which drives other accessory components including, but not limited to, pumps and compressors.

Powertrain torque control typically includes two torque control domains: axle torque and propulsion torque. In a mild hybrid powertrain, the propulsion torque is the output torque at the crankshaft of the ICE, which includes the EM torque contribution.

Powertrain systems also include several torque features, each of which seeks to influence the amount of drive torque at various points along the powertrain system. An upper level or global torque feature is a vehicle driver, who commands a desired output torque from the torque source(s) or a desired axle torque based on a driver input. Exemplary driver inputs include, but are not limited to, an accelerator pedal and a cruise control system. Modern powertrain systems include additional torque features or torque requests such as vehicle stability control systems, traction control systems, engine overspeed protection systems, transmission shift quality systems, engine and/or transmission component protection systems and/or driveline component protection systems, among several others. The torque features can number in the tens to over a hundred, depending upon the particular configuration of the powertrain system.

The torque features of a particular powertrain system are independent and can often seek to control the drive torque at the same time. Because the powertrain system can only produce a single drive torque value at any time, an arbitration system is required to determine the correct drive torque to produce. A control module is typically provided for arbitrating the multiple torque requests. In a hybrid powertrain system, this control module is responsible for arbitrating torque requests for a plurality of torque generators (e.g., the ICE and EM).

SUMMARY

Accordingly, the present invention provides a method of regulating a torque output of each of an internal combustion engine (ICE) and an electric machine (EM) in a hybrid powertrain system. The method includes determining a desired axle torque of the hybrid powertrain system and arbitrating the desired axle torque and a first plurality of torque requests in an engine control module (ECM) of the hybrid powertrain system to provide an arbitrated axle torque request. The method further includes arbitrating a torque request, which is based on the arbitrated axle torque request, and a second plurality of torque requests in a hybrid control module (HCM) to provide a final torque request, and generating ICE control signals and EM control signals based on the final torque request.

In one feature, the method further includes monitoring operating parameters of the hybrid powertrain system, wherein the desired axle torque is determined based on the operating parameters.

In another feature, the method further includes converting the arbitrated axle torque request into a propulsion torque request within the ECM, wherein the ECM arbitrates the propulsion torque request and a first plurality of propulsion torque requests to provide the torque request.

In other features, the method further includes determining a propulsion torque request within a transmission control module (TCM), wherein one of the second plurality of torque requests includes the propulsion torque request. The propulsion torque request is determined based on a gear ratio of a transmission of the hybrid powertrain system.

In still other features, the final torque request is a propulsion torque request, and the method further includes splitting the propulsion torque request into an ICE torque request and an EM torque request. At this point, the ICE torque request and the EM torque request can be considered torque commands. The ICE control signals are generated based on the ICE torque request and the EM control signals are generated based on the EM torque request.

In yet another feature, the HCM generates the EM control signals and the ECM generates said ICE control signals.

In summary, the present disclosure provides a coordinated torque control strategy that implements axle torque control in the ECM and splits the propulsion torque control responsibility between the ECM and the HCM. This coordinated torque control strategy facilitates component protection, engine overspeed prevention and system remedial action in the ECM, while the hybrid propulsion torque control resumes where the ECM leaves off and implements transmission torque control, regenerative braking, and engine overspeed prevention. In this manner, the responsibility for component protection, engine protection and remedial action for failures can be assigned to the ECM. Implementation of the transmission torque control in the HCM reduces the serial data link latency, while controlling the propulsion torque during a shift, which is important for clutch-to-clutch type transmissions.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
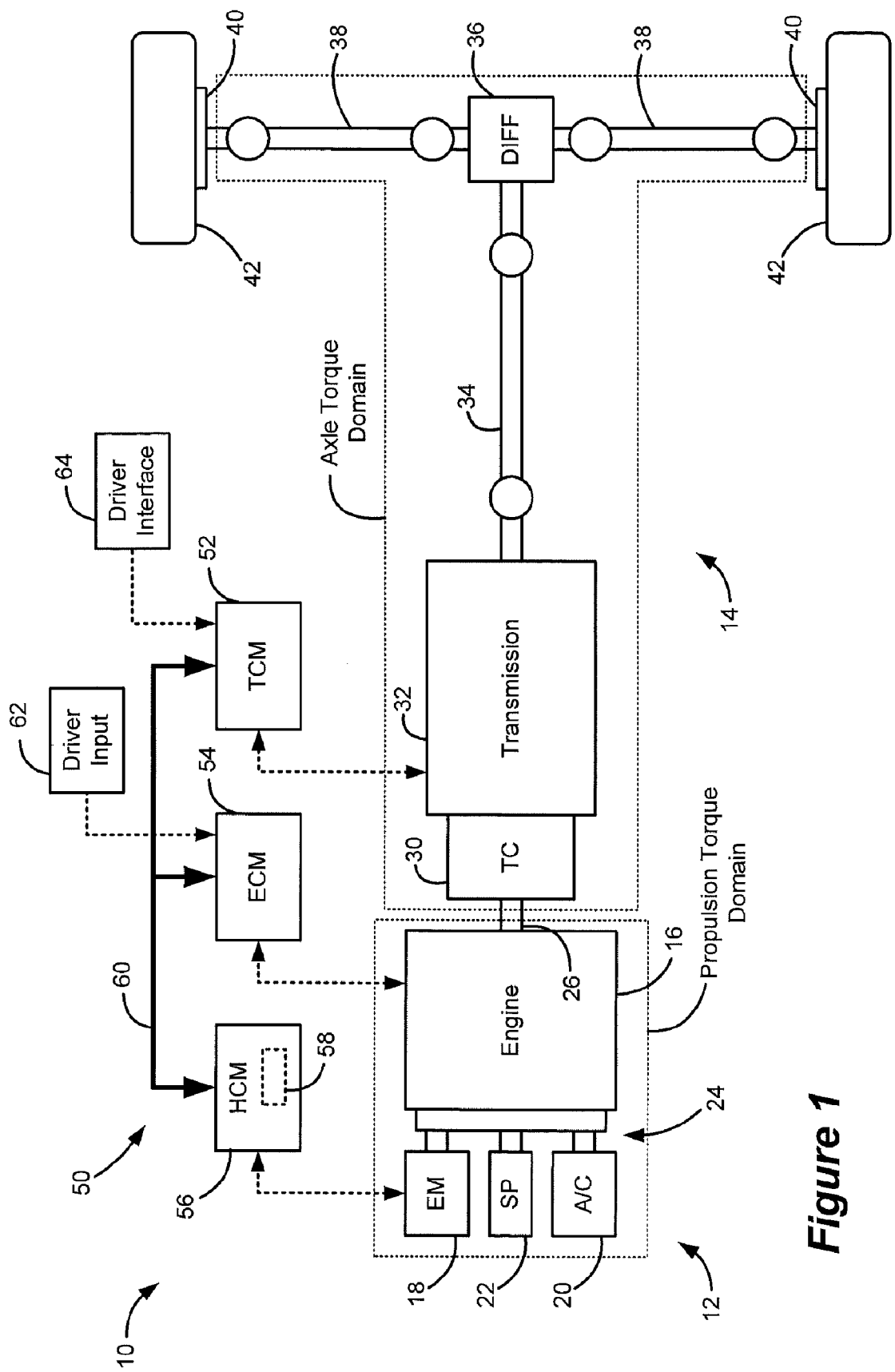
FIG. 1 is a functional block diagram of an exemplary hybrid powertrain system.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

At the outset, it is noted that inputs from a driver and/or a cruise control system, discussed in further detail below, are considered true torque requests in the sense that they reflect the amount of torque desired. All other torque modifiers including, but not limited to, traction control, stability control, engine overspeed protection, transmission torque limiting and the like, are typically considered torque interventions. These torque interventions are in either an active or inactive state. If all of the torque interventions are either inactive or apply a limit that does not end up limiting a torque request, the torque request will pass through unchanged. For purposes of clarity, the term torque request is used herein for both true torque requests as well as for torque interventions.

Referring now to FIG. 1, an exemplary hybrid powertrain 10 will be described in detail. Although the exemplary powertrain 10 is illustrated as a rear wheel drive (RWD) powertrain, it is appreciated that the coordinated torque control of the present disclosure can be implemented with any other powertrain configuration. The exemplary powertrain 10 includes a propulsion system 12 and a drivetrain system 14. The propulsion system 12 includes an internal combustion engine (ICE) 16 and an electric machine (EM) 18. The propulsion system can also include auxiliary components including, but not limited to, an A/C compressor 20 and a steering pump 22. The EM 18 and the auxiliary components are drivingly coupled to the engine using a belt and pulley system 24. The belt and pulley system 24 includes a plurality of pulleys that are fixed for rotation with the EM 18, the auxiliary components and the crankshaft 26 of the ICE 16, as well as a belt to enable torque to be transferred to/from the crankshaft 26 from/to the EM 18 and/or the auxiliary components. This configuration is referred to as a belt alternator starter (BAS) system.

The crankshaft 26 of the ICE 16 drives the drivetrain system 14. The drivetrain system 14 includes a flexplate or flywheel (not shown), a torque converter or other coupling device 30, a transmission 32, a propeller shaft 34, a differential 36, axle shafts 38, brakes 40 and driven wheels 42. A propulsion torque ($T_{PROP}$) that is output at the crankshaft 26 of the ICE 16 is transferred through the drivetrain system components to provide an axle torque ($T_{AXLE}$) at the axle shafts 38 to drive the wheels 42. More specifically, $T_{PROP}$ is multiplied by several gear ratios provided by the coupling device 30, the transmission 32 and the differential 36 to provide $T_{AXLE}$ at the axle shafts 38. Essentially, $T_{PROP}$ is multiplied by an effective gear ratio, which is a function of the ratio introduced by the coupling device 30, the transmission gear ratio determined by transmission input/output shaft speeds, the differential ratio, as well as any other component that may introduce a ratio in the drivetrain system 14 (e.g., a transfer case in a four wheel drive (4WD) or all wheel drive (AWD) powertrain). For the purposes of torque control, the $T_{AXLE}$ domain includes the ICE 16 and the EM 18.

The powertrain 10 also includes a control system 50, which regulates operation of the powertrain 10 based on the coordinated torque control of the present disclosure. The control system 50 includes a transmission control module (TCM) 52, an engine control module (ECM) 54 and a hybrid control module (HCM) 56. The HCM 56 can include one or more sub-modules including, but not limited to, a BAS control processor (BCP) 58. The TCM 52, ECM 54 and HCM 56 communicate with one another via a controller area network (CAN) bus 60. A driver input 62 communicates with the ECM. The driver input 62 can include, but is not limited to, an accelerator pedal and/or a cruise control system. A driver interface 64 communicates with the TCM 52. The driver interface 64 includes, but is not limited to, a transmission range selector (e.g., a PRNDL lever).

The coordinated torque control of the present disclosure includes the axle torque domain and the propulsion torque domain. $T_{PROP}$ is the crankshaft output torque, which may include the EM torque contribution. The coordinated torque control according to the present disclosure implements axle torque ($T_{AXLE}$) arbitration in the ECM to provide an arbitrated axle torque ($T_{AXLEARB}$) and splits the propulsion torque control responsibility to the ECM and the HCM. This split propulsion coordinated torque control facilitates component protection, engine overspeed prevention and system remedial action, among other torque requests, on the ECM. Hybrid propulsion torque control resumes in the HCM where the ECM leaves off and implements transmission torque control, regenerative braking, and engine overspeed prevention, among other torque requests.

Advantages of this torque control architecture include the assignment of responsibility for component protection, engine protection and remedial action for failures to the ECM. Implementation of the transmission torque control on the HCM reduces the serial data link latency, while controlling $T_{PROP}$ during a shift, which is important for clutch-to-clutch type transmissions. The TCM issues a torque intervention that may limit the partially arbitrated $T_{PROP}$ from the ECM.

The coordinated torque control of the present disclosure monitors the accelerator pedal position ($\alpha_{PED}$) and the vehicle speed ($V_{VEH}$). A driver intended or desired axle torque ($T_{AXLEDES}$) is determined based on $\alpha_{PED}$ and $V_{VEH}$. For example, $\alpha_{PED}$ and $V_{VEH}$ can be used as inputs to pre-calibrated, pre-stored look-up table, which provides a corresponding $T_{AXLEDES}$. The ECM arbitrates $T_{AXLEDES}$ and other torque requests to provide $T_{AXLEARB}$. The other torque requests include one or more torque requests provided in an axle torque request set. The torque requests are generated by a torque feature and include, but are not limited to, an absolute torque value, a minimum torque limit value, a maximum torque limit value or a delta torque value request. The torque features associated with the axle torque request set include, but are not limited to, a traction control system (TCS), a vehicle stability enhancement system (VSES) and a vehicle overspeed protection system (VOS). Upon determining $T_{AXLEARB}$. $T_{AXLEARB}$ is converted into a propulsion torque ($T_{PROPECM}$) within the ECM using the effective gear ratio. After having determined $T_{PROPECM}$, the ECM arbitrates $T_{PROPECM}$ and a plurality of other propulsion torque requests, for which the ECM is responsible, to provide a final $T_{PROPECM}$ to the HCM.

The HCM may issue a torque request to set the engine torque to zero by deactivating the engine cylinders (e.g., by shutting-off the fuel to the cylinders). This can occur during vehicle coast down situations when the accelerator pedal position is zero. For example, the fuel is shut-off and the regenerative braking of the vehicle commences to transfer the kinetic energy of the vehicle into electric power via the EM. To facilitate this, a torque converter clutch that links the wheel torque to the crankshaft is engaged. Through this, the EM is driven. Accordingly, a torque request going into the ECM propulsion torque arbitration is provided from the HCM, such that two torque requesters input into the ECM propulsion torque arbitration: the driver/cruise (axle torque arbitrated) propulsion torque request and an HCM zero fuel torque request.

The TCM provides an arbitrated propulsion torque value ($T_{PROPTCM}$). More specifically, the TCM arbitrates a plurality of torque requests from torque features. An exemplary TCM torque feature is a transmission protection algorithm that generates a maximum torque limit to limit the torque at the transmission input shaft. The maximum torque limit indicates the maximum allowable torque through the transmission input shaft in order to protect transmission components.

Both $T_{PROPECM}$ from the ECM and $T_{PROPTCM}$ from the TCM are sent to the HCM, which completes the $T_{PROP}$ arbitration. More specifically, the HCM arbitrates $T_{PROPECM}$, $T_{PROPECM}$ and other torque requests to provide $T_{PROPFINAL}$. The other torque requests include one or more torque requests provided in a propulsion torque request set. The torque requests are each generated by a torque feature and include, but are not limited to, an absolute torque value, a minimum torque limit value, a maximum torque limit value or a delta torque value request. The torque features associated with the propulsion torque request set include, but are not limited to, regenerative braking, engine overspeed protection and EM boost.

The HCM determines $T_{ICE}$ and $T_{EM}$ based on $T_{PROPFINAL}$. More specifically, the HCM includes an optimization algorithm, which partitions $T_{PROPFINAL}$ based on the available torque output of each of the ICE and the EM. $T_{ICE}$ is sent to the ECM, which generates control signals for achieving $T_{ICE}$ using the ICE. The HCM generates control signals based on $T_{EM}$ for achieving $T_{EM}$ using the EM.

Figure 2:
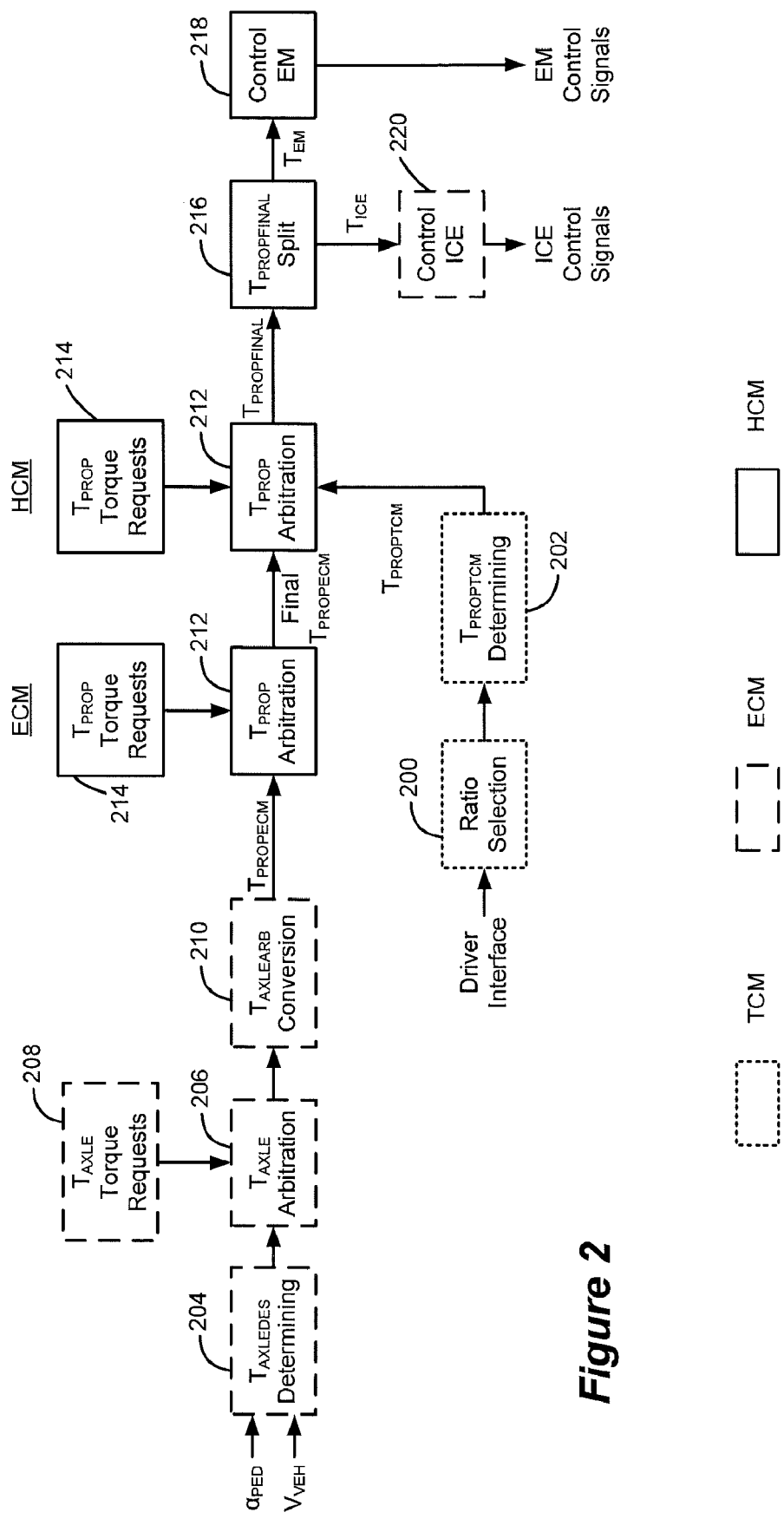
FIG. 2 is a functional block diagram of a coordinated torque control architecture in accordance with the present disclosure.

Referring now to FIG. 2, exemplary modules that execute the coordinated torque control of the present disclosure will be described in detail. The modules having short-dashed borders are modules that are associated with the TCM. The modules having long-dashed borders are modules that are associated with the ECM. The modules having solid borders are modules that are associated with the HCM. The exemplary modules include a ratio selection module 200, a $T_{PROPTCM}$ determining module 202, a $T_{AXLEDES}$ determining module 204, a $T_{AXLE}$ arbitration module 206, a $T_{AXLE}$ torque request module 208, a $T_{AXLEARB}$ conversion module 210, a $T_{PROP}$ arbitration module 212, a $T_{PROP}$ torque request module 214, a $T_{PROPFINAL}$ split module 216, an EM control module 218 and an ICE control module 220.

The ratio selection module 200 receives a signal from a driver interface. The driver interface includes, but is not limited to, a range selector (e.g., a PRNDL lever). The ratio selection module 200 determines a desired gear ratio of the transmission based on the driver interface input and other vehicle operating parameters. The $T_{PROPTCM}$ determining module 202 determines $T_{PROPTCM}$ based on the desired gear ratio provided by the ratio selection module 200. The $T_{AXLEDES}$ determining module 204 determines $T_{AXLEDES}$ based on $\alpha_{PED}$ and $V_{VEH}$. The $T_{AXLE}$ arbitration module 206 arbitrates $T_{AXLEDES}$ along with a plurality of other axle torque requests that are provided by the $T_{AXLE}$ torque request module 208. These other axle torque requests include one or more of the torque requests provided in the above-described first torque request set. The $T_{AXLE}$ arbitration module 206 outputs $T_{AXLEARB}$ to the $T_{AXLEARB}$ conversion module 210. The $T_{AXLEARB}$ conversion module 210 converts $T_{AXLEARB}$ to $T_{PROPECM}$ based on the effective gear ratio of the drivetrain. It is again noted that, after having determined $T_{PROPECM}$, the ECM arbitrates $T_{PROPECM}$ and a plurality of other propulsion torque requests, for which the ECM is responsible, to provide a final $T_{PROPECM}$ to the HCM.

The final $T_{PROPECM}$, $T_{PROPTCM}$ and other propulsion torque requests, for which the HCM is responsible, are input to the $T_{PROP}$ arbitration module. The other propulsion torque requests are provided by the $T_{PROP}$ torque request module 214 and include one or more of the torque requests provided in the above-described second torque request set. The $T_{PROP}$ arbitration module 212 arbitrates the various propulsion torque requests and outputs $T_{PROPFINAL}$. $T_{PROPFINAL}$ is provided to the $T_{PROPFINAL}$ split module, which proportions $T_{PROPFINAL}$ into $T_{EM}$ (i.e., the propulsion torque to be provided by the EM) and $T_{ICE}$ (i.e., the propulsion torque to be provided by the ICE). $T_{EM}$ is provided to the EM control module 218 and $T_{ICE}$ is provided to the ICE control module 220. The EM control module 218 generates EM control signals to generate $T_{EM}$ using the EM. Similarly, the ICE control module 220 generates ICE control signals to generate $T_{ICE}$ using the ICE.

Figure 3:
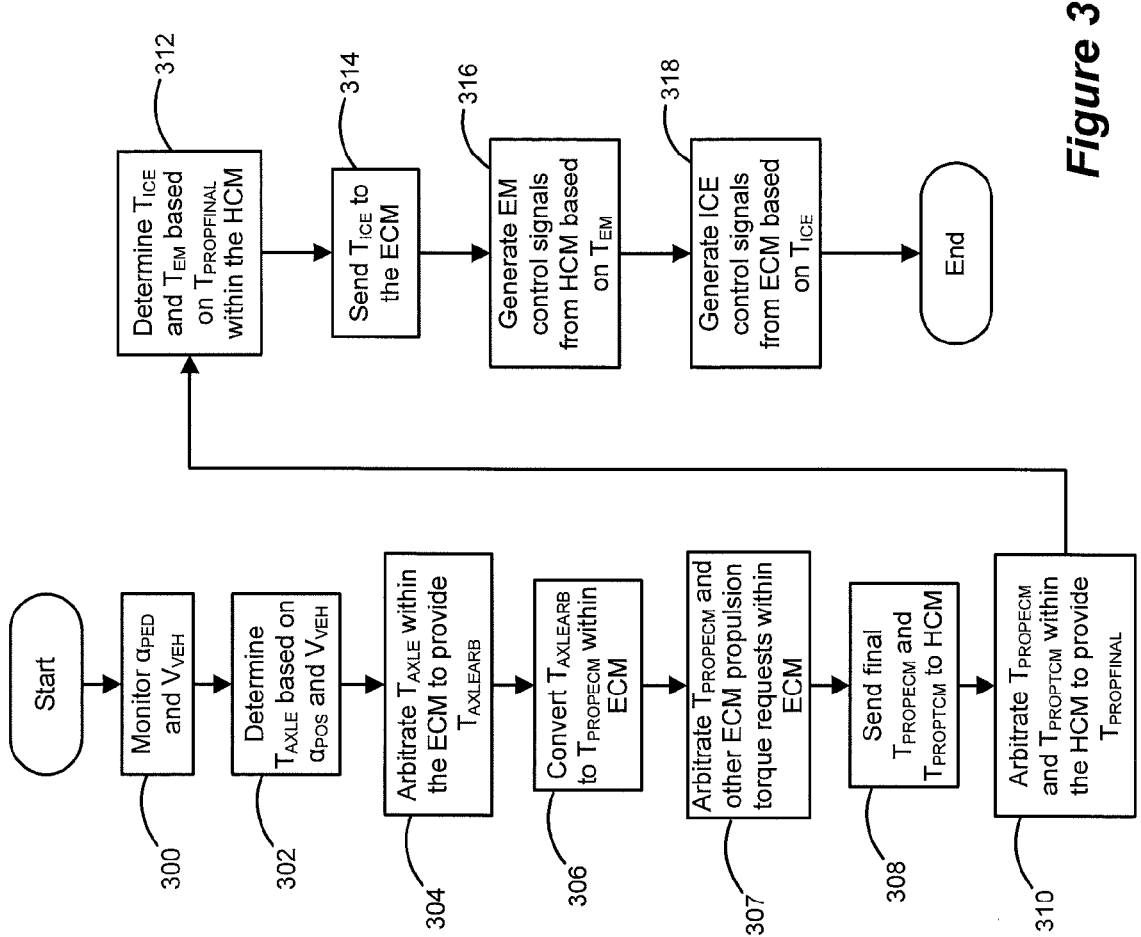
FIG. 3 is a flowchart of exemplary steps that are execute by the coordinated torque control of the present disclosure.

Referring now to FIG. 3, exemplary steps that are executed by the coordinated torque control of the present disclosure will be described in detail. In step 300, control monitors $\alpha_{PED}$ and $V_{VEH}$. Control determines $T_{AXLEDES}$ based on $\alpha_{PED}$ and $V_{VEH}$ in step 302. In step 304, control arbitrates $T_{AXLEDES}$ and other torque requests within the ECM to provide $T_{AXLEARB}$. The other torque requests include one or more of the torque requests provided in the above-described first torque request set. Control converts $T_{AXLEARB}$ into $T_{PROPECM}$ within the ECM using the effective gear ratio in step 306. It is again noted that, after having determined $T_{PROPECM}$, the ECM arbitrates $T_{PROPECM}$ and a plurality of other propulsion torque requests, for which the ECM is responsible, in step 307 to provide a final $T_{PROPECM}$ to the HCM.

In step 308, control sends both the final $T_{PROPECM}$ from the ECM and $T_{PROPTCM}$ from the TCM to the HCM. In step 310, control arbitrates $T_{PROPECM}$, $T_{PROPECM}$ and other torque requests within the HCM to provide $T_{PROPFINAL}$. The other torque requests include one or more of the torque requests provided in the above-described second torque request set. Control determines $T_{ICE}$ and $T_{EM}$ based on $T_{PROPFINAL}$ within the HCM in step 312. In step 314, control sends $T_{ICE}$ to the ECM. Control generates EM control signals from the HCM based on $T_{EM}$ in step 316. In step 318, control generates ICE control signals from the ECM based on $T_{ICE}$ and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of regulating a torque output of each of an internal combustion engine (ICE) and an electric machine (EM) in a hybrid powertrain system, comprising:
determining a desired axle torque of the hybrid powertrain system;
arbitrating said desired axle torque and a first plurality of torque requests in an engine control module (ECM) of the hybrid powertrain system to provide an arbitrated axle torque request;
arbitrating a torque request, which is based on said arbitrated axle torque request, and a second plurality of torque requests in a hybrid control module (HCM) to provide a final torque request; and
generating ICE control signals and EM control signals based on said final torque request.

2. The method of claim 1, further comprising monitoring operating parameters of the hybrid powertrain system, wherein said desired axle torque is determined based on said operating parameters.

3. The method of claim 1, further comprising converting said arbitrated axle torque request into a propulsion torque request within said ECM, the ECM arbitrates the propulsion torque request and a first plurality of propulsion torque requests to provide the torque request.

4. The method of claim 1, further comprising determining a propulsion torque request within a transmission control module (TCM), wherein one of said second plurality of torque requests includes said propulsion torque request.

5. The method of claim 4, wherein said propulsion torque request is determined based on a gear ratio of a transmission of the hybrid powertrain system.

6. The method of claim 1, wherein said final torque request is a propulsion torque request, and the method further comprises splitting said propulsion torque request into an ICE torque request and an EM torque request.

7. The method of claim 6, wherein said ICE control signals are generated based on said ICE torque request and said EM control signals are generated based on said EM torque request.

8. The method of claim 1, wherein said HCM generates said EM control signals and said ECM generates said ICE control signals.

9. A torque control system for regulating a torque output of each of an internal combustion engine (ICE) and an electric machine (EM) in a hybrid powertrain system, comprising:
a first module that determines a desired axle torque of the hybrid powertrain system;
an engine control module (ECM) that arbitrates said desired axle torque and a first plurality of torque requests to provide an arbitrated axle torque request; and
a hybrid control module (HCM) that arbitrates a torque request, which is based on said arbitrated axle torque request, and a second plurality of torque requests to provide a final torque request;
wherein said ECM generates ICE control signals and said HCM generates EM control signals based on said final torque request.

10. The torque control system of claim 9, wherein said first module monitors operating parameters of the hybrid powertrain system, wherein said desired axle torque is determined based on said operating parameters.

11. The torque control system of claim 9, wherein said ECM converts said arbitrated axle torque request into a propulsion torque request, and the ECM arbitrates the propulsion torque request and a first plurality of propulsion torque requests to provide the torque request.

12. The torque control system of claim 9, further comprising a transmission control module (TCM) that determines a propulsion torque request, wherein one of said second plurality of torque requests includes said propulsion torque request.

13. The torque control system of claim 12, wherein said propulsion torque request is determined based on a gear ratio of a transmission of the hybrid powertrain system.

14. The torque control system of claim 9, wherein said final torque request is a propulsion torque request, and the method further comprises splitting said propulsion torque request into an ICE torque request and an EM torque request.

15. The torque control system of claim 14, wherein said ICE control signals are generated based on said ICE torque request and said EM control signals are generated based on said EM torque request.

16. A method of regulating a torque output of each of an internal combustion engine (ICE) and an electric machine (EM) in a hybrid powertrain system, comprising:
determining a desired axle torque of the hybrid powertrain system based on operating parameters thereof;
arbitrating said desired axle torque and a first plurality of torque requests in an engine control module (ECM) of the hybrid powertrain system to provide an arbitrated axle torque request;
generating a first propulsion torque request based on said arbitrated axle torque request;
arbitrating said first propulsion torque request, a second propulsion torque request and a second plurality of torque requests in a hybrid control module (HCM) to provide a final torque request; and
generating ICE control signals and EM control signals based on said final torque request.

17. The method of claim 16, further comprising monitoring said operating parameters of the hybrid powertrain system, wherein said include an accelerator pedal position and a vehicle speed.

18. The method of claim 17, further comprising converting said arbitrated axle torque request into said first propulsion torque request based on an effective gear ratio of the hybrid powertrain system, wherein the ECM arbitrates the first propulsion torque request and a first plurality of propulsion torque requests to provide an arbitrated first propulsion torque request.

19. The method of claim 17, further comprising determining said second propulsion torque request within a transmission control module (TCM).

20. The method of claim 16, wherein said final torque request is a propulsion torque request, and the method further comprises splitting said propulsion torque request into an ICE torque request and an EM torque request.

21. The method of claim 20, wherein said ICE control signals are generated based on said ICE torque request and said EM control signals are generated based on said EM torque request.

22. The method of claim 16, wherein said HCM generates said EM control signals and said ECM generates said ICE control signals.

* * * * *